(12) United States Patent
Huber et al.

(10) Patent No.: US 11,204,360 B2
(45) Date of Patent: Dec. 21, 2021

(54) SWITCH FOR A CONVEYING LINE FOR TRANSPORTING A LABORATORY DIAGNOSTIC VESSEL CARRIER

(71) Applicant: Roche Diagnostics Operations, Inc., Indianapolis, IN (US)

(72) Inventors: David Huber, Ebikon (CH); Daniel Arnold, Merendschwand (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 184 days.

(21) Appl. No.: 15/995,209

(22) Filed: Jun. 1, 2018

(65) Prior Publication Data

US 2018/0356435 A1   Dec. 13, 2018

(30) Foreign Application Priority Data

Jun. 8, 2017  (EP) .................................... 17175002

(51) Int. Cl.
  *G01N 35/04*      (2006.01)
  *B65G 47/76*      (2006.01)
(52) U.S. Cl.
  CPC ............ *G01N 35/04* (2013.01); *B65G 47/766* (2013.01); *B65G 2201/0261* (2013.01); *G01N 2035/0406* (2013.01); *G01N 2035/047* (2013.01); *G01N 2035/0467* (2013.01); *G01N 2035/0468* (2013.01); *G01N 2035/0472* (2013.01);
  (Continued)
(58) Field of Classification Search
  None
  See application file for complete search history.

(56) References Cited

U.S. PATENT DOCUMENTS

| 3,613,885 A | 10/1971 | Rehse et al. |
| 4,798,095 A | 1/1989 | Itoh |
| 5,529,166 A | 6/1996 | Markin et al. |

(Continued)

FOREIGN PATENT DOCUMENTS

| DE | 2644137 A1 | 4/1978 |
| EP | 2889236 A1 | 7/2015 |

(Continued)

OTHER PUBLICATIONS

Machine-generated English translation of WO 2016/016546, pp. 1-6, Feb. 2016. (Year: 2016).*

(Continued)

*Primary Examiner* — Kathryn Wright
*Assistant Examiner* — P. Kathryn Wright
(74) *Attorney, Agent, or Firm* — Roche Diagnostics Operations, Inc.

(57) ABSTRACT

A switch for a conveying line for transporting a laboratory diagnostic vessel carrier is presented. The conveying line comprises a first line portion and a second line portion. The switch comprises a curved first guiding surface and a second guiding surface. The switch is moveable between a first position, in which the laboratory diagnostic vessel carrier is transportable along the curved first guiding surface from the first line portion to the second line portion, and a second position, in which the laboratory diagnostic vessel carrier is further transportable along the second guiding surface on the first line portion. A switch assembly and a conveying line are also disclosed.

14 Claims, 6 Drawing Sheets

(52) U.S. Cl.
CPC ............... *G01N 2035/0475* (2013.01); *G01N 2035/0486* (2013.01)

(56) References Cited

U.S. PATENT DOCUMENTS

| | | |
|---|---|---|
| 5,651,941 A | 7/1997 | Stark et al. |
| 5,941,366 A | 8/1999 | Quinlan et al. |
| 2005/0207937 A1* | 9/2005 | Itoh .................. G01N 35/04 422/63 |
| 2005/0271555 A1 | 12/2005 | Itoh |
| 2010/0012460 A1* | 1/2010 | Pedrazzini ....... G01N 35/00732 198/394 |
| 2010/0034701 A1* | 2/2010 | Pedrazzini ............ G01N 35/04 422/65 |
| 2010/0300831 A1 | 12/2010 | Pedrazzini |
| 2013/0240324 A1 | 9/2013 | Abbestam et al. |
| 2014/0072473 A1 | 3/2014 | Haechler et al. |
| 2015/0014125 A1 | 1/2015 | Hecht |
| 2015/0233957 A1 | 8/2015 | Riether |
| 2016/0039615 A1* | 2/2016 | Otts .................. B65G 47/82 198/368 |
| 2017/0045545 A1 | 2/2017 | Pollack et al. |

FOREIGN PATENT DOCUMENTS

| | | |
|---|---|---|
| EP | 2902790 A1 | 8/2015 |
| JP | S61-66705 U | 5/1986 |
| JP | H07-144733 A | 6/1995 |
| JP | H07-239333 A | 9/1995 |
| JP | 2000-146988 A | 5/2000 |
| JP | 2013-083538 A | 5/2013 |
| JP | 2015-141024 A | 8/2015 |
| WO | 2008/043393 A1 | 4/2008 |
| WO | 2008/067845 A1 | 6/2008 |
| WO | 2010/061546 A1 | 6/2010 |
| WO | 2010/085670 A1 | 7/2010 |
| WO | 2011/138448 A1 | 11/2011 |
| WO | 2012/094049 A1 | 7/2012 |
| WO | 2013/051495 A1 | 11/2013 |
| WO | 2016/012517 A1 | 1/2016 |

OTHER PUBLICATIONS

European Search Report dated Nov. 17, 2017 in Application No. 17175002, 4 pp.

* cited by examiner

SWITCH FOR A CONVEYING LINE FOR TRANSPORTING A LABORATORY DIAGNOSTIC VESSEL CARRIER

CROSS-REFERENCE TO RELATED APPLICATIONS

This application claims the benefit of EP 17175002.9, filed Jun. 8, 2017, which is hereby incorporated by reference.

BACKGROUND

The present disclosure relates to a switch for a conveying line for transporting a laboratory diagnostic vessel carrier, to a switch assembly and to a conveying line.

Laborsaving for examination work in the medical field has recently proceeded by introducing diverse automated devices. For example, for testing in a hospital, the samples of inpatients and outpatients are collected from several sections of the hospital and collectively processed in an examination room. Test items for each sample are sent from doctors to the examination room by use of an online information processing system. Test results are then reported online from the examination room to the doctors. For many of test items on blood or urine, pretreatment for testing needs to be performed such as centrifugal process, unplugging, dispensing, and the like. It takes much time for engagement in such pretreatment work in total testing working hours.

The flow of a process to be performed by a general automated sample testing system is now described. A vessel such as test tube that holds a body fluid such as blood collected from a patient is held by a vessel carrier. The vessel carrier holding the vessel such as the test tube is loaded into the general automated sample testing system. Barcode information of the loaded sample is read in the system so that the sample type is recognized. As described above, the centrifugal process, unplugging, dispensing, and the like are performed as the pretreatment for the test process.

The contents of the pretreatment vary depending on the sample type, for example, for a urine test, the centrifugal process does not need to be performed. A sample type that needs to be subjected to the centrifugal separation is a sample on which the unplugging and dispensing are performed after centrifugal separation. The dispensing process, usually known as aliquoting, is a process in which a child sample is generated from a parent sample. For example, dispensed child samples can be simultaneously transported to multiple analyzers that are connected to the system online. A sample that is completed with all processes is stored in a storage module.

The automated sample testing system is introduced in a relatively large facility where hundreds to thousands samples are processed in a day or even per hour. In such large facility, many samples are collected from one patient for multiple testing such as a biochemical test, an immunological test, a solidification test, and a hematological test. Therefore, the number of sample carriers for the hundreds to thousands patients are needed for loading into the automated sample testing system, and accordingly, a space for installing such a sample testing system is required.

For conveying the respective samples to the multiple analyzers, usually a conveying line is installed. Such a conveying line usually comprises several conveying means such as conveying belt which are present in different line portions. Also a transport system for vessel carriers can be used as conveying lines.

For different reasons, it is necessary to direct the vessel carriers to different line portions of the conveying line. For example, in some error cases and after an initialization, the probes in the test tubes need to be moved back to a tube identification station. Running the whole system backwards is not possible with each system.

Despite the advantages provided by sample transport apparatuses, there are still some drawbacks. The guiding of the samples is not smoothly and reliable. Particularly, the direction changing arm engages the test tube and not the vessel carrier such that there is a risk that the test tube and the vessel carrier tilt over.

Therefore, there is a need for a switch for a conveying line for transporting a laboratory diagnostic vessel carrier, switch assembly and a conveying line allowing to smoothly and reliably change the transport direction for a vessel carrier.

SUMMARY

According to the present disclosure, a switch for a conveying line for transporting a laboratory diagnostic vessel carrier is presented. The conveying line can comprise a first line portion and a second line portion. The switch can comprise a curved first guiding surface and a second guiding surface. The switch can be moveable between a first position, in which the laboratory diagnostic vessel carrier is transportable along the curved first guiding surface from the first line portion to the second line portion, and a second position, in which the laboratory diagnostic vessel carrier is further transportable along the second guiding surface on the first line portion.

Accordingly, it is a feature of the embodiments of the present disclosure to provide for a switch for a conveying line for transporting a laboratory diagnostic vessel carrier, switch assembly and a conveying line allowing to smoothly and reliably change the transport direction for a vessel carrier. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
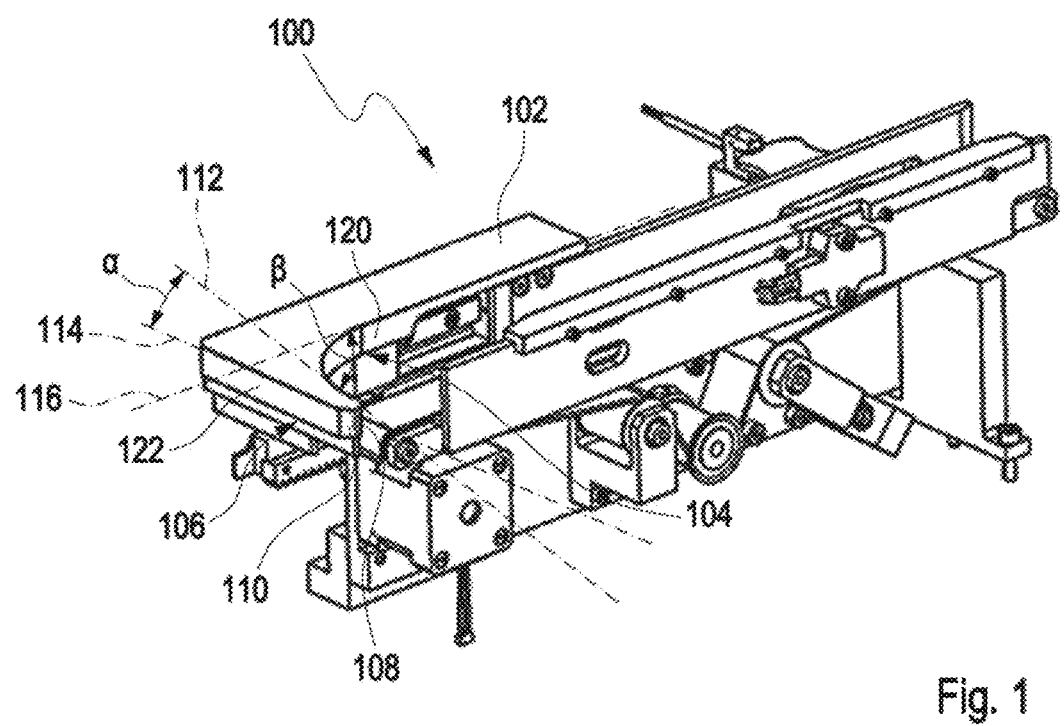
FIG. 1 illustrates a perspective view of a switch assembly according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it can be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment" or similar expressions are intended to be optional features, without any restriction regarding alternative embodiments, without any restrictions regarding the scope and without any restriction regarding the possibility of combining the features introduced in such way with other optional or non-optional features.

The disclosed switch for a conveying line for transporting a laboratory diagnostic vessel carrier, which conveying line comprises a first line portion and a second line portion, can comprise a curved first guiding surface and a second guiding surface. The switch can be moveable between a first position, in which the laboratory diagnostic vessel carrier is transportable along the curved first guiding surface from the first line portion to the second line portion, and a second position, in which the laboratory diagnostic vessel carrier is further transportable along the second guiding surface on the first line portion.

The term "laboratory diagnostic vessel" as used herein can refers to any type of container suitable to store a sample or reagent in the field of analytics such as, for example, medical analytics. Such vessels can usually be designed as tubes. The term "laboratory diagnostic vessel carrier" as used herein can basically refer to any device configured to hold one or more laboratory diagnostic vessels and to be supplied through a conveying line. Thus, the vessel carrier may be configured as a single vessel carrier suitable to receive a single laboratory diagnostic vessel or a rack suitable to receive a plurality of vessels. Without any restriction, particular embodiments are described with reference to so called test tube holders. Such a test tube holder can hold one single test tube containing a sample or reagent and convey the test tube via a conveyor line to different modules of an automated sample testing system. The test tube holder can comprise a housing with a spring for fixing a test tube, a test tube holder body housing, and a bottom lid housing. The housing with a spring for fixing a test tube can have a columnar structure whose center part can be roundly bored so as to allow the insertion of the test tube, and can be provided with spring parts inside projecting parts extending upward. It can be noted that the housing with a spring usually has a columnar shape, but it may have any shape as long as the housing can vertically hold the test tube by the spring parts provided equidistantly or equiangularly, and an outer shape of the housing may be a polygonal column shape. The test tube holder body housing can have a cylindrical shape, and can have a cavity part therein. In the cavity part, a tag with a unique ID number, a weight for stably conveying the test tube, and others can be housed. Also, the test tube holder body housing and the bottom lid housing can have an outer diameter larger than that of the test tube to be conveyed and smaller than the width of the conveyor line. Note that the shape of the test tube holder body housing and the bottom lid housing may be, for example, a polygonal shape. Even in that case, a maximum length in a cross-sectional direction can desirably be smaller than the width of the conveyor line. Particular test tube holder that may be used are described in EP 2 902 790 A1, the contents thereof concerning vessel carriers is incorporated by reference in this application.

Thus, the switch can smoothly and reliably guide the vessel carrier as the switch can provide two guiding surfaces along which the vessel carrier may be transported in each of the two positions, either the first position or the second position. Thus, the vessel carrier can be engaged by the guiding surfaces and reliably guided to its target line portion.

The switch may be configured to enter the first line portion in the first position and may be configured to retract from the first line portion in the second position such that the second guiding surface can be flush with a boundary of the first line portion. Thus, switch may be moved into or out of the first line portion. When moved out of the first line portion, the second guiding surface can be designed such that the boundary of the first line portion and the second guiding surface smoothly transition into one another. Thus, the vessel carrier can be smoothly transported along the boundary as well as along the second guiding surface.

The second guiding surface may be straight. Thus, the switch can provide no change of the transporting direction for the vessel carrier if guided along the second guiding surface.

The curved first guiding surface may be curved at an angle of about 10° to about 180° in one embodiment, about 25° to about 120° in another embodiment, and about 45° to about 90° in yet another embodiment. Thus, the first guiding surface may be designed with a broad range for the curvature and provide a smooth guidance with each curvature.

The curved first guiding surface and the second guiding surface may be configured to engage the laboratory diagnostic vessel carrier. Thus, each of curved first guiding surface and the second guiding surface can engage the laboratory diagnostic vessel carrier rather than the laboratory diagnostic vessel which can prevent the laboratory diagnostic vessel and the laboratory diagnostic vessel carrier from tilting over.

The curved first guiding surface and the second guiding surface may each comprise an input end configured to face a transport direction of the first line portion. The input ends of the curved first guiding surface and the second guiding surface can be arranged adjacent to one another. Thus, the switch may need to be moved only a rather small distance in order to cause a change of the transporting direction for the laboratory diagnostic vessel carrier.

The switch may be linearly moveable between the first position and the second position. Such a movement may be realized with only a few constructional members in a rather simple manner.

The curved first guiding surface may be curved with a radius of about 20 mm to about 80 mm in one embodiment, about 25 mm to about 60 mm in another embodiment, and about 30 mm to about 45 mm in yet another embodiment. Thus, the radius may be adapted to the respective application or dimensions of the conveying line.

The radius may correspond to a width of the first line portion. Thus, an abrupt change of the transport direction can be avoided.

The laboratory diagnostic vessel carrier may be a single laboratory diagnostic vessel carrier. Thus, each laboratory diagnostic vessel carrier may be configured to hold a single laboratory diagnostic vessel.

The curved first guiding surface and/or the second guiding surface may comprise a protrusion configured to partially engage the laboratory diagnostic vessel carrier. The protrusion may be rib-shaped.

The disclosed switch assembly can comprise a switch as described above and a drive configured to move the switch between the first position and the second position. Thus, the switch may be moved in an automated manner.

The drive may comprise a stepping motor, a tooth rack, a tooth wheel and a linear gear. Thus, the switch may be moved by well-established constructional members such the overall configuration may be realized in a cost efficient manner.

The tooth rack may be connected to the switch. The linear gear and the tooth wheel may be connected to the stepping motor. The tooth wheel can engage with the tooth rack. Thus, a rather compact configuration can be provided.

The drive may be configured to move the switch with a hub of about 20 mm to about 80 mm in one embodiment, about 25 mm to about 60 mm in another embodiment, and about 30 mm to about 45 mm in yet another embodiment. Thus, with a rather small hub a change of the transporting direction may be realized.

The switch assembly may further comprise at least one light barrier configured to detect whether the switch is in the first position and/or configured to detect whether the switch is in the second position. Thus, the exact position of the switch may be monitored.

The disclosed conveying line for transporting a laboratory diagnostic vessel carrier can comprise a first line portion, a second line portion, and switch as described above or a switch assembly as described above.

A computer program is disclosed and proposed including computer-executable instructions for performing the method/switch/switch assembly according to the present disclosure in one or more of the embodiments enclosed herein when the program is executed on a computer or computer network. Specifically, the computer program may be stored on a computer-readable data carrier. Thus, specifically, one, more than one or even all of method steps as indicated above may be performed by using a computer or a computer network, particularly by using a computer program.

The disclosure can further disclose and propose a computer program product having program code, in order to perform the method/switch/switch assembly according to the present disclosure in one or more of the embodiments enclosed herein when the program is executed on a computer or computer network. Specifically, the program code may be stored on a computer-readable data carrier.

Further, the disclosure can disclose and propose a data carrier having a data structure stored thereon, which, after loading into a computer or computer network, such as into a working memory or main memory of the computer or computer network, may execute the method/switch/switch assembly according to one or more of the embodiments disclosed herein.

The disclosure can further propose and disclose a computer program product with program code stored on a machine-readable carrier, in order to perform the method/switch/switch assembly according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, the disclosure can propose and disclose a modulated data signal which can contain instructions readable by a computer system or computer network, for performing the method/switch/switch assembly according to one or more of the embodiments disclosed herein.

Referring to the computer-implemented aspects of the disclosure, one or more of the method steps or even all of the method steps of the method/switch/switch assembly according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the present disclosure further discloses:

a computer or computer network comprising at least one processor, wherein the processor can be adapted to perform the method/switch/switch assembly according to one of the embodiments described in this description, a computer loadable data structure that can be adapted to perform the method/switch/switch assembly according to one of the embodiments described in this description while the data structure is being executed on a computer, a computer program, wherein the computer program can be adapted to perform the method/switch/switch assembly according to one of the embodiments described in this description while the program is being executed on a computer, a computer program comprising a program for performing the method/switch/switch assembly according to one of the embodiments described in this description while the computer program can be executed on a computer or on a computer network, a computer program comprising a program according to the preceding embodiment, wherein the program can be stored on a storage medium readable to a computer, a storage medium, wherein a data structure can be stored on the storage medium and wherein the data structure can be adapted to perform the method/switch/switch assembly according to one of the embodiments described in this description after having been loaded into a main and/or working storage of a computer or of a computer network, and a computer program product having program code, wherein the program code can be stored or are stored on a storage medium, for performing the method/switch/switch assembly according to one of the embodiments described in this description, if the program code executed on a computer or on a computer network.

A switch for a conveying line for transporting a laboratory diagnostic vessel carrier is presented. The conveying line can comprise a first line portion and a second line portion. The switch can comprise a curved first guiding surface and a second guiding surface. The switch can be moveable between a first position, in which the laboratory diagnostic vessel carrier is transportable along the curved first guiding surface from the first line portion to the second line portion, and a second position, in which the laboratory diagnostic vessel carrier is further transportable along the second guiding surface on the first line portion.

The switch can be configured to enter the first line portion in the first position. The switch can be configured to retract from the first line portion in the second position such that the second guiding surface can be flush with a boundary of the first line portion. The second guiding surface can be straight.

The curved first guiding surface can be curved at an angle of about 10° to about 180° in one embodiment, about 25° to about 120° in another embodiment, and about 45° to about 90° in yet another embodiment.

The curved first guiding surface and the second guiding surface can be configured to engage the laboratory diagnostic vessel carrier.

The curved first guiding surface and the second guiding surface can each comprise an input end configured to face a transport direction of the first line portion. The input ends of the curved first guiding surface and the second guiding surface can be arranged adjacent to one another. The switch can be linearly moveable between the first position and the second position.

The curved first guiding surface can be curved with a radius of about 20 mm to about 80 mm in one embodiment, about 25 mm to about 60 mm in another embodiment, and about 30 mm to about 45 mm in yet another embodiment. The radius can correspond to a width of the first line portion.

The laboratory diagnostic vessel carrier can be a single laboratory diagnostic vessel carrier.

The curved first guiding surface and/or the second guiding surface can comprise a protrusion configured to partially engage the laboratory diagnostic vessel carrier. The protrusion can be rib-shaped.

A switch assembly can comprise an above switch and a drive configured to move the switch between the first position and the second position. The drive can comprise a stepping motor, a tooth rack, a tooth wheel and a linear gear. The tooth rack can be connected to the switch. The linear gear and the tooth wheel can be connected to the stepping motor. The tooth wheel can engage with the tooth rack. The drive can be configured to move the switch with a hub of about 20 mm to about 80 mm in one embodiment, about 25 mm to about 60 mm in another embodiment, and about 30 mm to about 45 mm in yet another embodiment.

The switch assembly can further comprise at least one light barrier configured to detect whether the switch is in the first position and/or configured to detect whether the switch is in the second position.

A conveying line for transporting a laboratory diagnostic vessel carrier can comprise a first line portion, a second line portion, and an above switch or an above switch assembly.

Referring initially to FIG. 1, FIG. 1 shows a perspective view of a switch assembly 100. The switch assembly 100 can comprise a switch 102. The switch 102 can comprise a curved first guiding surface 104 and a second guiding surface 106. The second guiding surface 106 can be straight. The curved first guiding surface and the second guiding surface 106 can each comprise an input end 108, 110. The input ends 108, 110 of the curved first guiding surface 104 and the second guiding surface 106 can be arranged adjacent to one another. Tangents 112, 114 to the input ends 108, 110 can form an acute angle α. The angle α may be in a range of about 2° to about 35° in one embodiment, about 2° to about 30° in another embodiment, and about 2° to about 25° in yet another embodiment such as, for example about 20° or even 20°. The curved first guiding surface 104 can be curved at an angle β of about 10° to about 180° in one embodiment, about 25° to about 120° in another embodiment, and about 45° to about 90° in yet another embodiment, such as, for example, 85° or even 90°. The angle β can be defined between the tangent 112 to the input end 108 of the first guiding surface 104 and a tangent 116 to an output end 118 of the first guiding surface 104. The curved first guiding surface 104 can be curved with a radius of about 20 mm to about 80 mm in one embodiment, about 25 mm to about 60 mm in another embodiment, and about 30 mm to about 45 mm in yet another embodiment such as, for example, 40 mm. The first guiding surface 104 and the second guiding surface 106 can each comprise a rib-shaped protrusion 120, 122 located at an upper portion thereof. The rib-shaped protrusion 120 of the first guiding surface 104 can extend along the curvature thereof. The rib-shaped protrusion 122 of the second guiding surface 106 can extend along the straight formation thereof.

Figure 2:
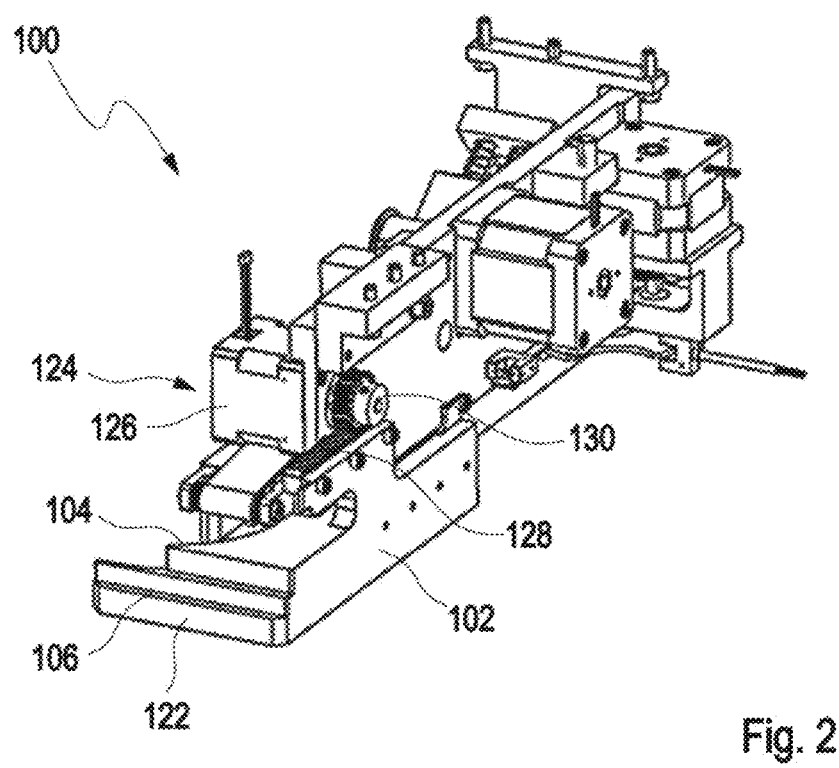
FIG. 2 illustrates a perspective view from underneath of the switch assembly according to an embodiment of the present disclosure.

FIG. 2 shows a perspective view from underneath of the switch assembly 100. The switch 102 can be moveable between a first position and a second position. The switch 102 can be linearly moveable between the first position and the second position. The switch assembly 100 can comprise a drive 124 configured to move the switch 102 between the first position and the second position. The drive 124 can comprise a stepping motor 126, a tooth rack 128, a tooth wheel 130 and a linear gear (not shown in detail). The tooth rack 128 can be connected to the switch 102. The tooth rack 128 can be mounted to a lower side of the switch 102. The stepping motor 126 can be located below the switch 102. The linear gear and the tooth wheel 130 can be connected to the stepping motor 126. The tooth wheel 130 can engage with the tooth rack 128. The drive 124 can be configured to move the switch 102 with a hub of about 20 mm to about 80 mm in one embodiment, about 25 mm to about 60 mm in another embodiment, and about 30 mm to about 45 mm in yet another embodiment such as, for example, about 40 mm. Operating the stepping motor 126 can cause the linear gear to operate and to rotate the tooth wheel 130. Rotation of the tooth wheel 130 can cause the tooth rack 128 and, thus, the switch 102 to linearly move. Optionally, the switch assembly 100 may further comprise at least one light barrier configured to detect whether the switch 102 is in the first position and/or configured to detect whether the switch 102 is in the second position.

Figure 3:
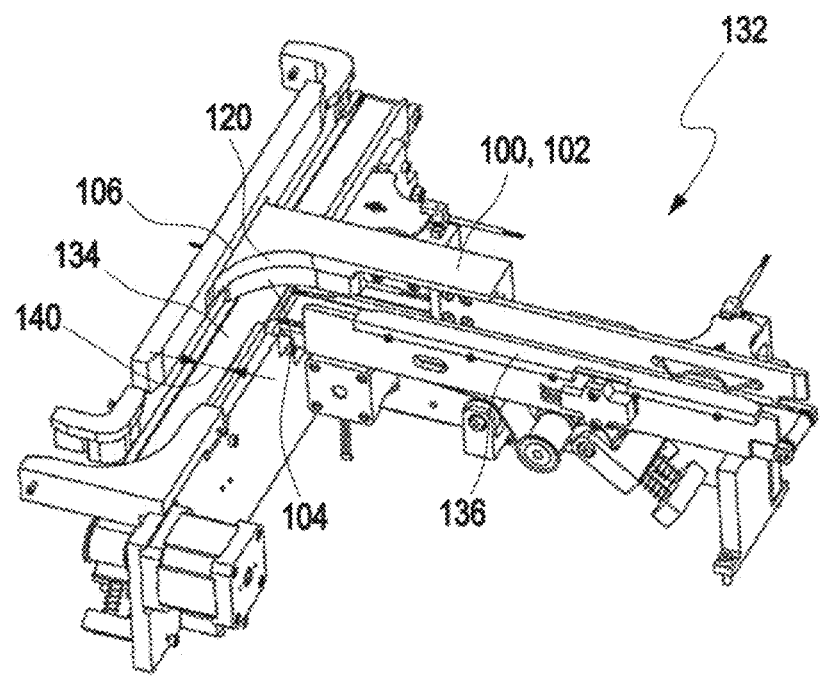
FIG. 3 illustrates a perspective view of a conveying line with the switch in the first position according to an embodiment of the present disclosure.
Figure 4:
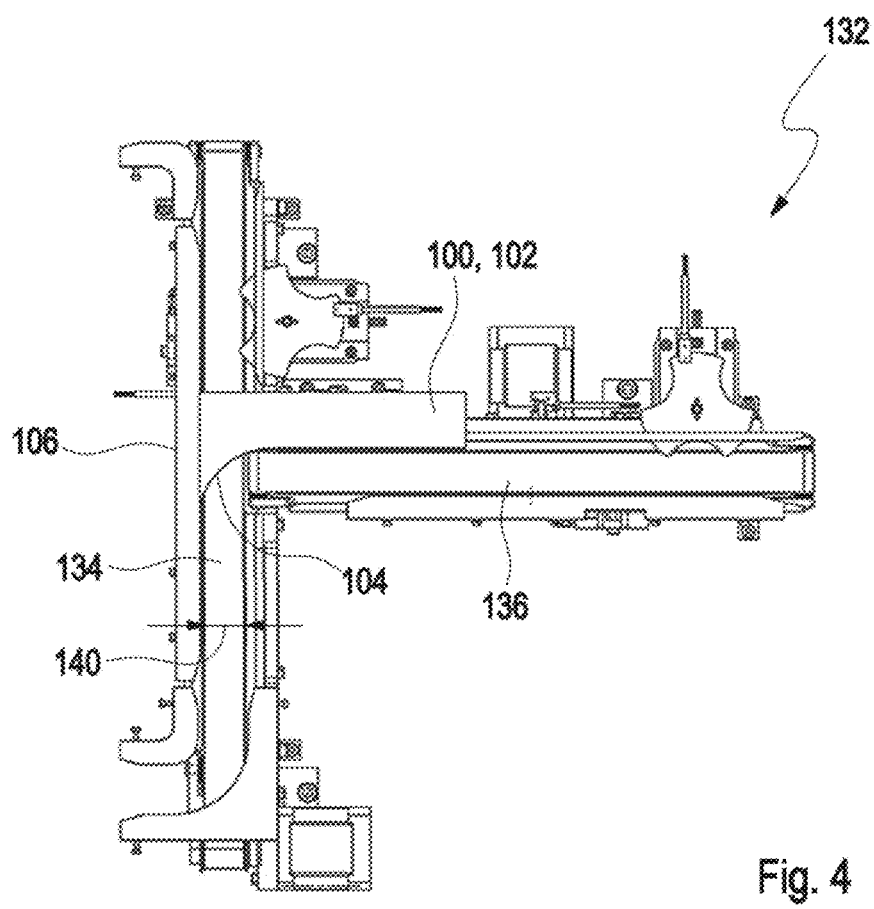
FIG. 4 illustrates a top view of the conveying line with the switch in the first position according to an embodiment of the present disclosure.
Figure 5:
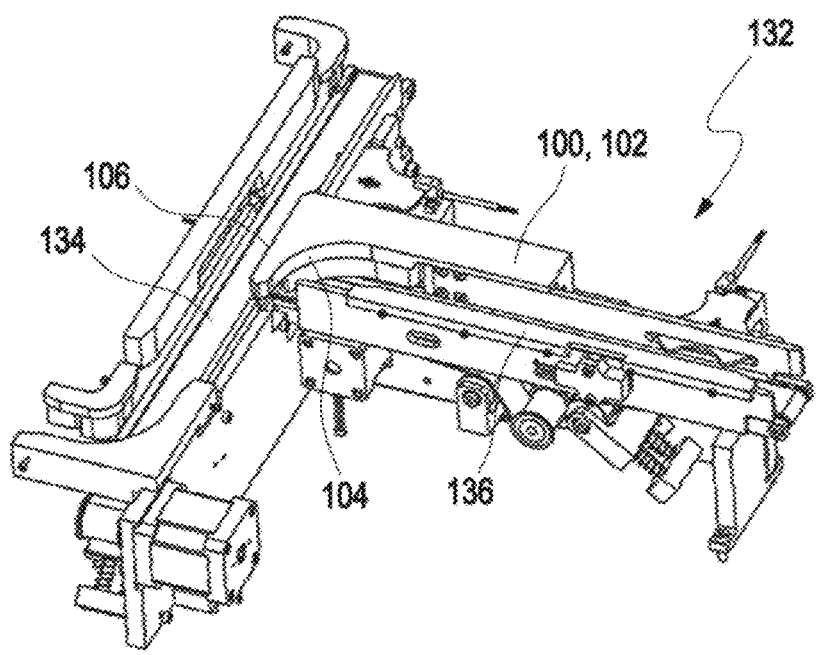
FIG. 5 illustrates shows a perspective view of the conveying line with the switch in the second position according to an embodiment of the present disclosure.
Figure 6:
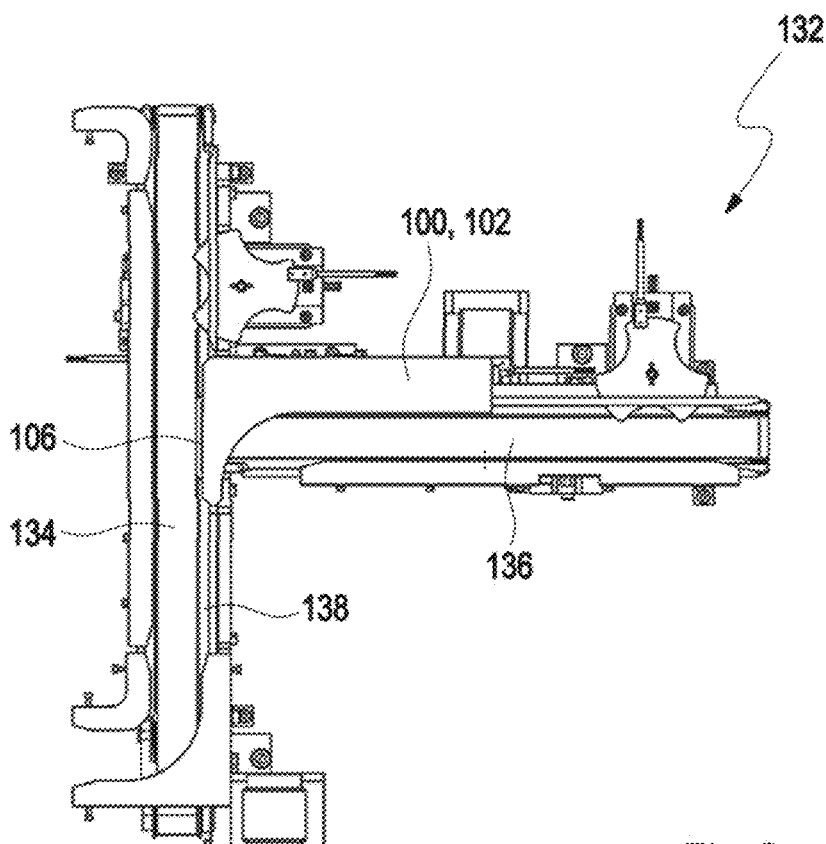
FIG. 6 illustrates a top view of the conveying line with the switch in the second position according to an embodiment of the present disclosure.

FIG. 3 shows a perspective view of a conveying line 132 to which the switch assembly 100 can be installed with the switch 102 in the first position. FIG. 4 shows a top view of the conveying line 132 with the switch 102 in the first position. FIG. 5 shows a perspective view of the conveying line 132 with the switch 102 in the second position. FIG. 6 shows a top view of the conveying line 132 with the switch 102 in the second position. The conveying line 132 can comprise a first line portion 134 and a second line portion 136. The second line portion 136 can be arranged substantially perpendicular with respect to the first line portion 134. The switch 102 can be configured to enter the first line portion 134 in the first position as shown in FIGS. 3 and 4. Further, the switch 102 can be configured to retract from the first line portion 134 in the second position such that the second guiding surface 106 can be flush with a boundary 138 of the first line portion 134 as shown in FIGS. 5 and 6. The radius of the curved first guiding surface 104 can correspond to a width 140 of the first line portion 134.

Figure 7:
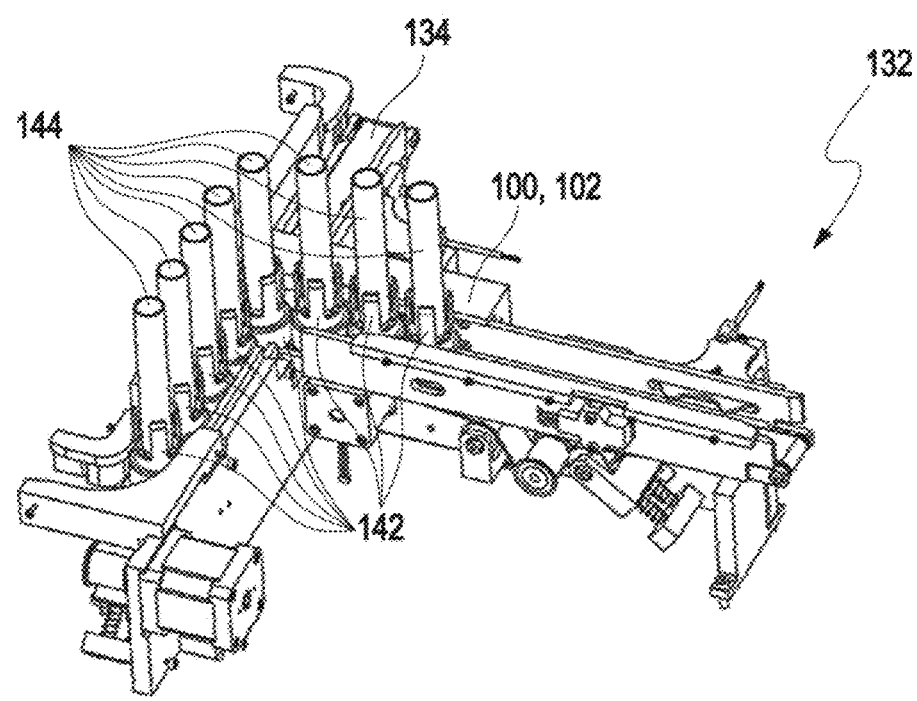
FIG. 7 illustrates a perspective view of the conveying line during operation with the switch in the first position according to an embodiment of the present disclosure.
Figure 8:
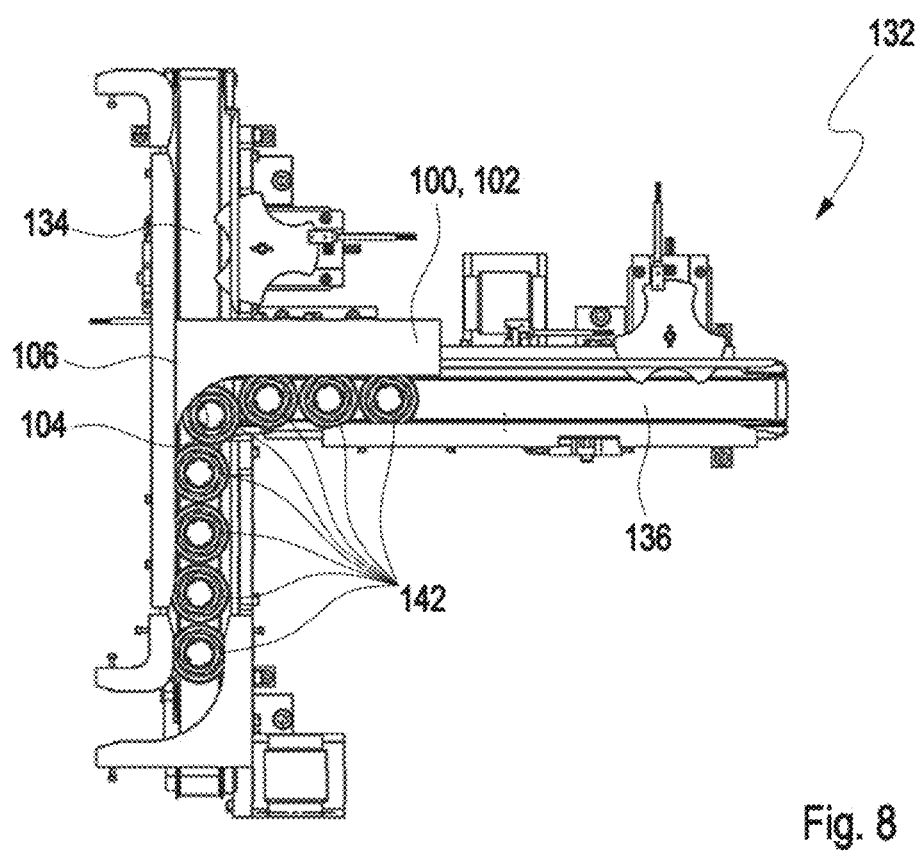
FIG. 8 illustrates a top view of the conveying line during operation with the switch in the first position according to an embodiment of the present disclosure.
Figure 9:
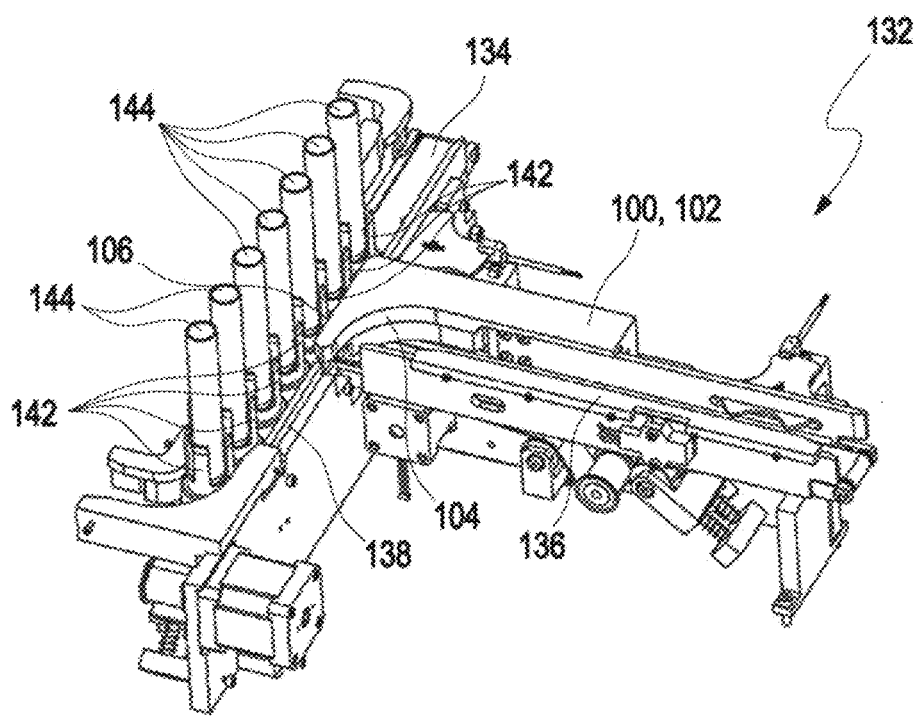
FIG. 9 illustrates a perspective view of the conveying line during operation with the switch in the second position according to an embodiment of the present disclosure.
Figure 10:
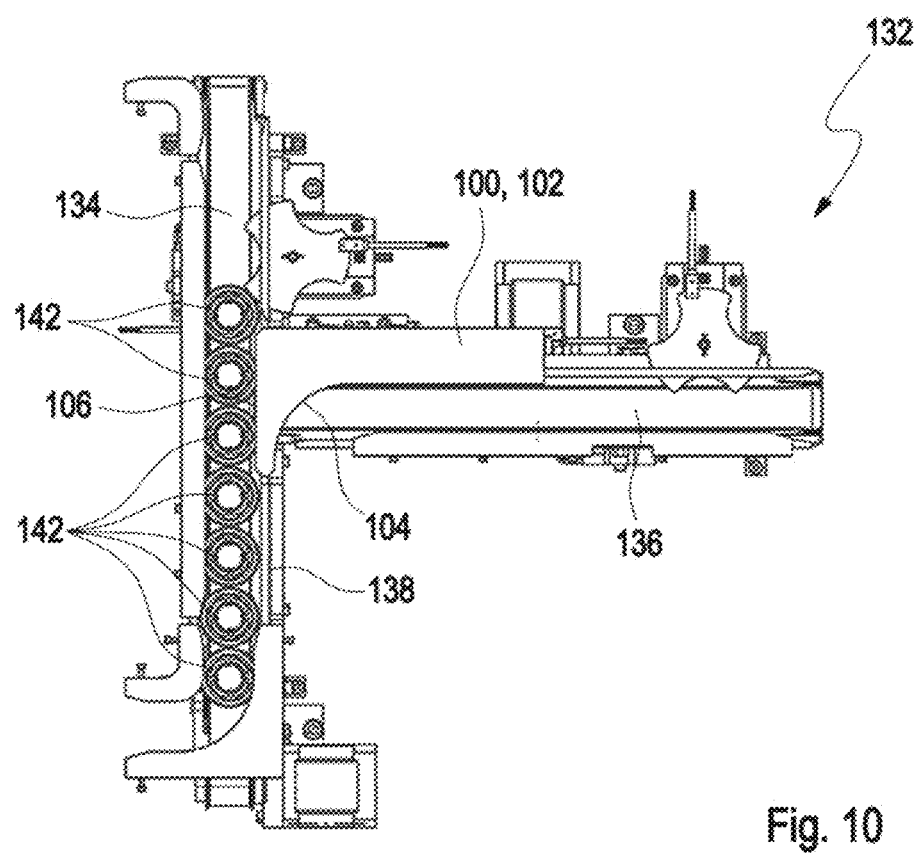
FIG. 10 illustrates a top view of the conveying line during operation with the switch in the second position according to an embodiment of the present disclosure.

FIG. 7 shows a perspective view of the conveying line 132 during operation with the switch 102 in the first position. FIG. 8 shows a top view of the conveying line 132 during operation with the switch 102 in the first position. FIG. 9 shows a perspective view of the conveying line 132 during operation with the switch 102 in the second position. FIG. 10 shows a top view of the conveying line 132 during operation with the switch 102 in the second position. The conveying line 132 can be configured to transport a laboratory diagnostic vessel carrier 142. The laboratory diagnostic vessel carrier 142 can be a single laboratory diagnostic vessel carrier. It can be noted that FIGS. 7-10 show a plurality of laboratory diagnostic vessel carriers 142 which may be transported on the conveying line 132. The curved first guiding surface 104 and the second guiding surface 106 can be configured to engage the laboratory diagnostic vessel carrier 142 as will be explained in further detail below. In the first position of the switch 102, the laboratory diagnostic vessel carrier 142 can be transportable along the curved first guiding surface 104 from the first line portion 134 to the second line portion 136 as shown in FIGS. 7 and 8. In the second position of the switch 102, the laboratory diagnostic vessel carrier 142 can further be transportable along the second guiding surface 106 on the first line portion 134 as shown in FIGS. 9 and 10.

Figure 11:
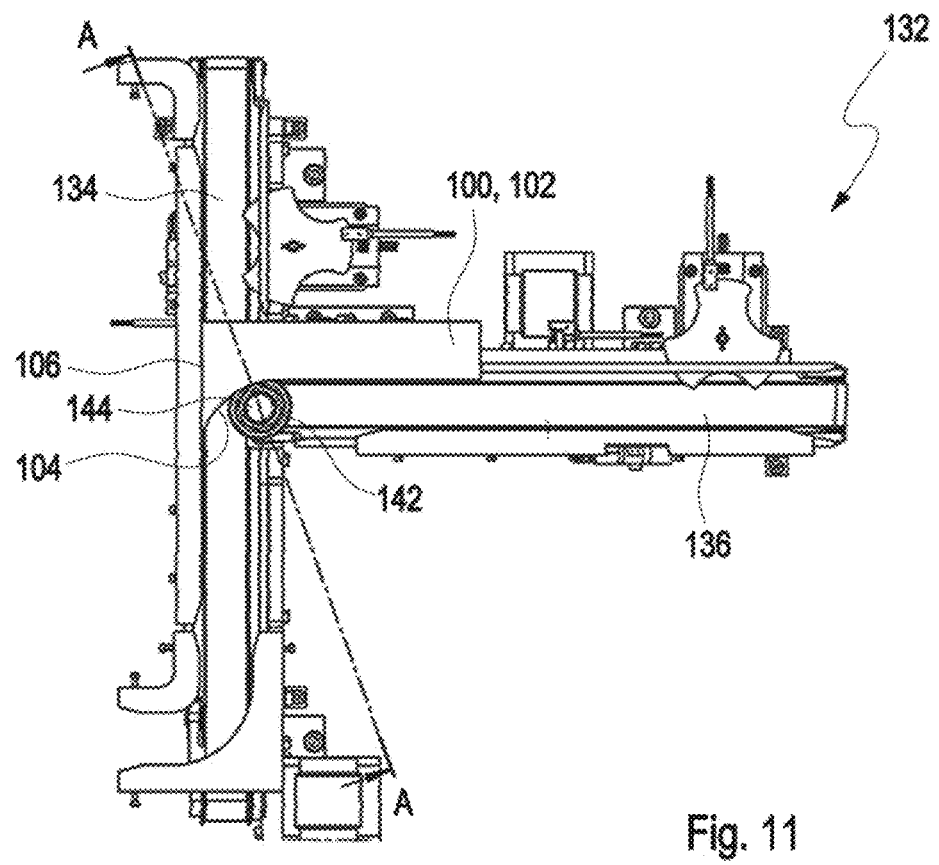
FIG. 11 illustrates a top view of the conveying line during operation with the switch in the first position according to an embodiment of the present disclosure.

FIG. 11 shows a top view of the conveying line 132 during operation with the switch 102 in the first position. For explanatory purposes, only one laboratory diagnostic vessel carrier 142 is shown which is a single test tube holder that holds a laboratory diagnostic vessel 144 such as a test tube. The curved first guiding surface 104 can engage the laboratory diagnostic vessel carrier 142 so as to transport the same to the second line portion 136.

Figure 12:
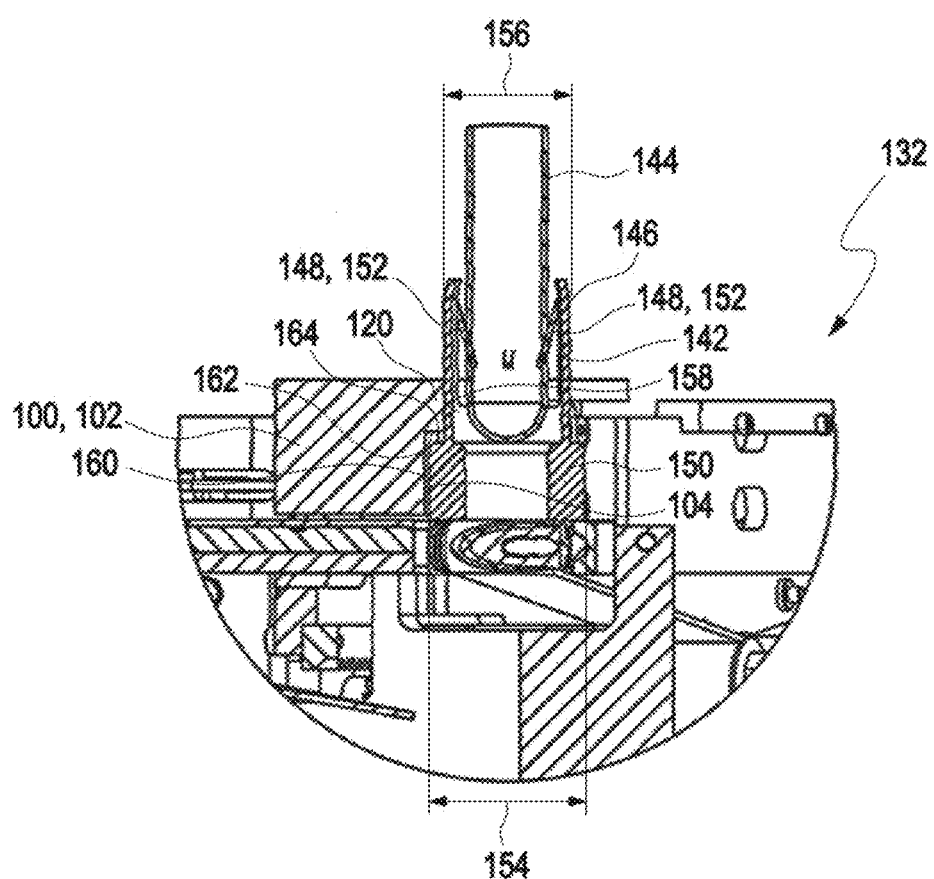
FIG. 12 illustrates an enlarged view of a detail of a cross-section taken along line A-A of FIG. 11 according to an embodiment of the present disclosure.

FIG. 12 shows an enlarged view of a detail of a cross-section taken along line A-A of FIG. 11. The laboratory diagnostic vessel carrier 142 can comprise a housing 146 with a spring 148 for fixing the test tube, a test tube holder body housing 150, and a bottom lid housing. The housing 146 with the spring 148 for fixing a test tube can have a columnar structure whose center part can be roundly bored so as to allow the insertion of the test tube and can be provided with spring parts 152 inside projecting parts extending upward. It can be noted that the housing 146 with the spring 148 can usually have a columnar shape, but it may have any shape as long as the housing 146 can vertically hold the test tube by the spring parts 152 of the spring 148 provided equidistantly or equiangularly. The test tube holder body housing 150 can have a cylindrical shape. The housing 146 can be arranged on the test tube holder body housing 150 and the bottom lid housing. As shown in FIG. 11, the test tube holder body housing 150 can have a width 154 larger than a width 156 of the housing with the spring 148. As such, the test tube holder body housing 150 can laterally protrude from the housing 146 if seen in a top view.

As mentioned above, the first guiding surface 104 can comprise the rib shaped protrusion 120. The rib shaped protrusion 120 can partially engage the laboratory diagnostic vessel carrier 142. In other words, the rib shaped protrusion 120 can engage a portion of the laboratory diagnostic vessel carrier 142 as will be explained in further detail below. The rib shaped protrusion 120 can be configured such that a front surface 158 of the rib shaped protrusion 120 can engage the housing 146 while a portion 160 of the first guiding surface 104 located below the rib shaped protrusion 120 can engage the test tube holder body housing 150. Further, a distance between a lower side 162 of the rib shaped protrusion 120 and a top surface 164 of the test tube holder body housing 150 can be rather small such that the laboratory diagnostic vessel carrier 142 may not tilt over as the top surface 164 of the test tube holder body housing 150 can immediately engage the lower side 162 of the rib shaped protrusion 120 when starting to tilt. Thus, the laboratory diagnostic vessel carrier 142 may be smoothly and reliably guided along the first guiding surface 104. It can be explicitly stated that the rib shaped protrusion 122 of the second guiding surface 106 may be identically designed to the rib shaped protrusion 120 of the first guiding surface 104.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A switch for conveying a laboratory diagnostic vessel carrier from a first line portion of a conveying line to a second line portion of the conveying line, the switch comprising:
a curved first guiding surface, wherein the curved first guiding surface is curved with a radius corresponding to a width of the first line portion; and
a second guiding surface, wherein the switch is moveable between a first position, in which the laboratory diagnostic vessel carrier is transportable continuously along the curved first guiding surface from the first line portion to the second line portion, and a second position, in which the laboratory diagnostic vessel carrier is further transportable continuously along the second guiding surface on the first line portion, wherein the second guiding surface is flush with a boundary of the first line portion, wherein the curved first guiding surface and the second guiding surface are configured to engage the laboratory diagnostic vessel carrier, and wherein the curved first guiding surface and/or the second guiding surface comprises a rib-shaped protrusion extending from the curved first guiding surface and/or the second guiding surface configured to engage the laboratory diagnostic vessel carrier.

2. The switch according to claim 1, wherein the switch is configured to enter the first line portion in the first position and wherein the switch is configured to retract from the first line portion in the second position.

3. The switch according to claim 1, wherein the second guiding surface is straight.

4. The switch according to claim 1, wherein the curved first guiding surface is curved at an angle of 10° to 180°, wherein the angle is defined between a tangent to an input end of the curved first guiding surface and a tangent to an output end of the curved first guiding surface.

5. The switch according to claim 1, wherein the curved first guiding surface and the second guiding surface each comprise an input end configured to face a transport direction of the first line portion and wherein the input ends of the curved first guiding surface and the second guiding surface are arranged adjacent to one another.

6. The switch according to claim 1, wherein the switch is linearly moveable between the first position and the second position.

7. The switch according to claim 1, wherein the curved first guiding surface is curved with a radius of 20 mm to 80 mm, wherein the radius is a radius of a curve which equals a radius of a circular arc which best approximates the curve.

8. The switch according to claim 1, wherein the laboratory diagnostic vessel carrier is a single laboratory diagnostic vessel carrier.

9. A switch assembly, the switch assembly comprising:
a switch according to claim 1; and
a drive configured to move the switch between the first position and the second position.

10. The switch assembly according to claim 9, wherein the drive comprises a stepping motor, a tooth rack, a tooth wheel and a linear gear, wherein the linear gear and the tooth wheel are connected to the stepping motor and wherein the tooth wheel engages with the tooth rack.

11. The switch assembly according to claim 9, wherein the drive is configured to move the switch with a hub of 20 mm to 80 mm, wherein the hub is a length difference between a start position and an end position.

12. The switch assembly according to claim 9, further comprising,
at least one light barrier configured to detect whether the switch is in the first position and/or configured to detect whether the switch is in the second position.

13. A conveying line for transporting a laboratory diagnostic vessel carrier, the conveying line comprising:
a first line portion;
a second line portion; and
a switch according to claim 1.

14. A conveying line for transporting a laboratory diagnostic vessel carrier, the conveying line comprising:
a first line portion;
a second line portion; and
a switch assembly according to claim 9.

* * * * *